United States Patent
Kronfeld et al.

(10) Patent No.: US 8,604,963 B1
(45) Date of Patent: Dec. 10, 2013

(54) RADAR SYSTEM AND METHOD

(75) Inventors: Kevin M. Kronfeld, Cedar Rapids, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 319 days.

(21) Appl. No.: 12/892,690

(22) Filed: Sep. 28, 2010

(51) Int. Cl.
*G01S 13/00* (2006.01)

(52) U.S. Cl.
USPC ............... 342/26 B; 342/26 R; 342/26 D (58) Field of Classification Search
USPC ..... 342/26 R, 26 B, 26 D, 59, 64, 73, 96, 191
See application file for complete search history.

(56) References Cited

U.S. PATENT DOCUMENTS

| | | | |
|---|---|---|---|
| 6,043,756 A * | 3/2000 | Bateman et al. | 340/945 |
| 6,448,922 B1 * | 9/2002 | Kelly | 342/26 R |
| 7,205,928 B1 * | 4/2007 | Sweet | 342/26 B |
| 8,054,214 B2 * | 11/2011 | Bunch | 342/26 R |
| 8,085,182 B2 * | 12/2011 | Kauffman | 342/26 B |
| 8,138,960 B2 * | 3/2012 | Nonaka et al. | 342/25 A |
| 8,217,828 B2 * | 7/2012 | Kirk | 342/62 |
| 2002/0039072 A1 * | 4/2002 | Gremmert et al. | 340/945 |
| 2009/0219197 A1 * | 9/2009 | Bunch | 342/26 B |
| 2010/0328143 A1 * | 12/2010 | Kirk | 342/26 B |

OTHER PUBLICATIONS

Salazar, J.L.; Hopf, A.; Contreras, R.F.; Philips, B.; Knapp, E.J.; McLaughlin, D.; Brotzge, J.; Brewster, K., "Coverage comparison of short range radar networks vs. conventional weather radars: Case study in the northwestern United States," Geoscience and Remote Sensing Symposium,2009 IEEE International,IGARSS 2009 , vol. 2, no., pp. II-964-II-967.*

* cited by examiner

*Primary Examiner* — John B. Sotomayor
*Assistant Examiner* — Marcus Windrich
(74) *Attorney, Agent, or Firm* — Donna P. Suchy; Daniel M. Barbieri (57) ABSTRACT

A system includes an aircraft radar system configured to perform at least one radar scan of a specific region and receives airborne radar return data from the at least one radar scan. The aircraft radar system transmits the airborne radar return data to a weather system via a wireless communication link for supplementing the ground based radar return data with the airborne radar return data.

20 Claims, 8 Drawing Sheets

RADAR SYSTEM AND METHOD

BACKGROUND

The present disclosure relates generally to the field of radar systems. More specifically, the disclosure relates to aircraft weather radar systems.

The National Weather Service WSR-88D Next Generation Radar (NEXRAD) that was deployed in 1988 is the conventional sensor used for detection and warning of severe weather in the United States. The NEXRAD is also used for flight planning by airline operations centers. The system has provided significant advancements in the detection and forecasting of weather, however, it has "gaps" where no data is collected by the ground radars, specifically in cone of silence and umbrella of silence regions. The warn on forecast capability of the NEXRAD could be improved, but the current ground radars lack the update rates to improve the capability. There are also geometry limits with the ground radars that affect radar coverage regardless of the update rate. Gaps may also be formed because of terrain obstruction. Dense ground weather sensor networks may be installed to minimize terrain obstruction, but such a network may be cost prohibitive, particularly in mountainous regions where complete coverage is nearly impossible.

What is needed is a system and method for more completely providing global radar coverage of airspace. What is also needed is a system and method for reducing gaps in radar coverage where no data is collected. What is further needed is a system and method for providing radar coverage in cone of silence and umbrella of silence regions. What is needed further still is a system and method for providing better detection and forecasting of weather for aircraft flight planning What is needed further still is a system and method for extending coastal radar coverage off shore.

SUMMARY

One exemplary embodiment relates to a system that includes an aircraft radar system configured to perform at least one radar scan of a specific region and receives airborne radar return data from the at least one radar scan. The aircraft radar system transmits the airborne radar return data to a weather system via a wireless communication link for supplementing the ground based radar return data with the airborne radar return data.

Another exemplary embodiment relates to a method for supplementing ground radar data with airborne radar data. The method includes receiving ground based radar return data at a weather system, generating a command using the weather system for directing at least one airborne radar scan of a specific region, transmitting the command from the weather system to one or more aircraft via a wireless communication link, and receiving airborne radar return data at one or more aircraft radar systems from the at least one radar scan of the specific region. The at least one scan is performed in response to the command. The method also includes receiving the airborne radar return data from the at least one aircraft radar system at the weather system via the wireless communication link and supplementing the ground based radar return data with the airborne radar return data using the weather system. Alternatively, the one or more aircraft may request data from the weather system on the specific region or the one or more aircraft may automatically scan a region based on known gaps in ground radar coverage.

Another exemplary embodiment relates to a radar system. The radar system includes means for receiving ground based radar return data at a weather system, means for generating a command using the weather system for directing at least one airborne radar scan of a specific region, means for transmitting the command from the weather system to an aircraft via a wireless communication link, means for performing the at least one radar scan of the specific region using an aircraft radar system, means for receiving airborne radar return data at the aircraft radar system from the at least one radar scan, means for transmitting the airborne radar return data from the aircraft radar system to the weather system via the wireless communication link, and means for supplementing the ground based radar return data with the airborne radar return data using the weather system.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for increasing global radar coverage is shown. The system can include one or more aircraft having an electronic display, a weather radar system, processing electronics, and a communication system. The system can also include a weather system configured to gather ground radar scans and airborne radar scans from the aircraft. The weather system directs the aircraft to areas where the ground radar scans result in data gaps because of terrain obstructions, a cone of silence, and umbrella of silence, an inoperative radar, lack of coverage in an area, etc. The weather system may combine the data from the ground and airborne radar scans to provide more complete weather data. The method can include directing aircraft to gather data from areas where ground radar provides a gap in coverage and combining data from ground and airborne radar to increase radar sweep or scan coverage. When the ground station or other aircraft receive weather information from another source, the information can be used to refine an existing weather assessment including deriving a weather forecast.

Figure 1:
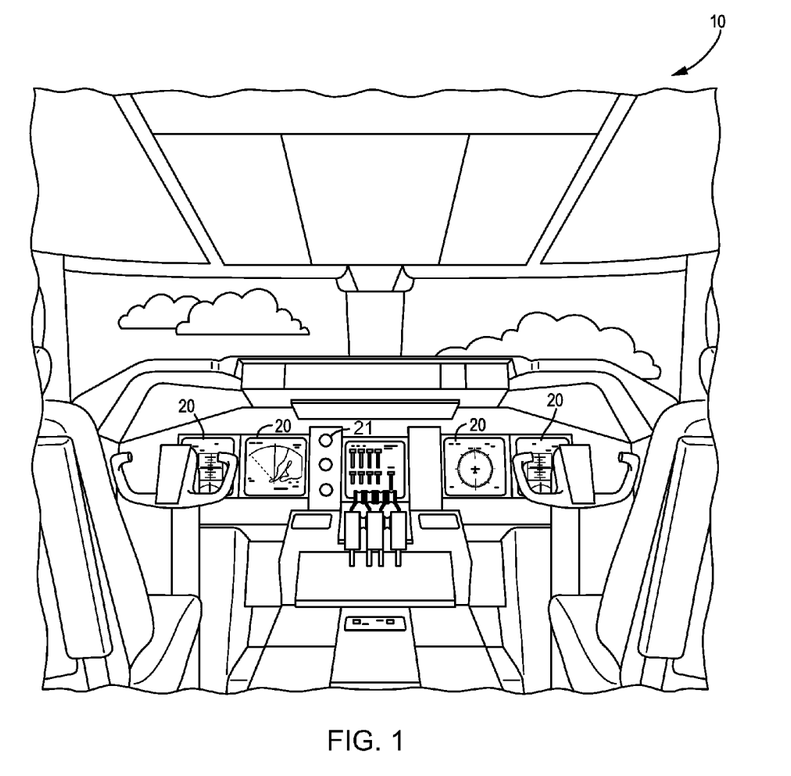
FIG. 1 is an illustration of an aircraft control center or cockpit, according to an exemplary embodiment.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a flight crew as to whether the terrain features displayed on the electronic display are correct or incorrect.

In an exemplary embodiment, flight displays 20 can provide an output from a radar system, LIDAR system, infrared system, or other system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional (3-D) perspective image of terrain and/or weather information or a four dimensional (4-D) display of weather information or forecast information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
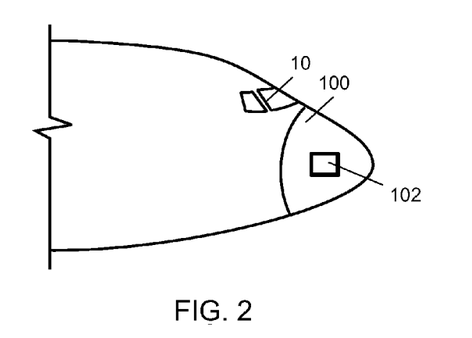
FIG. 2 shows the front of an aircraft with an aircraft control center and nose, according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft. According to other exemplary embodiments, radar system 102 may be a light detection and ranging (LIDAR) system, an infrared system, a passive optical system (e.g., camera system) etc.

Figure 3:
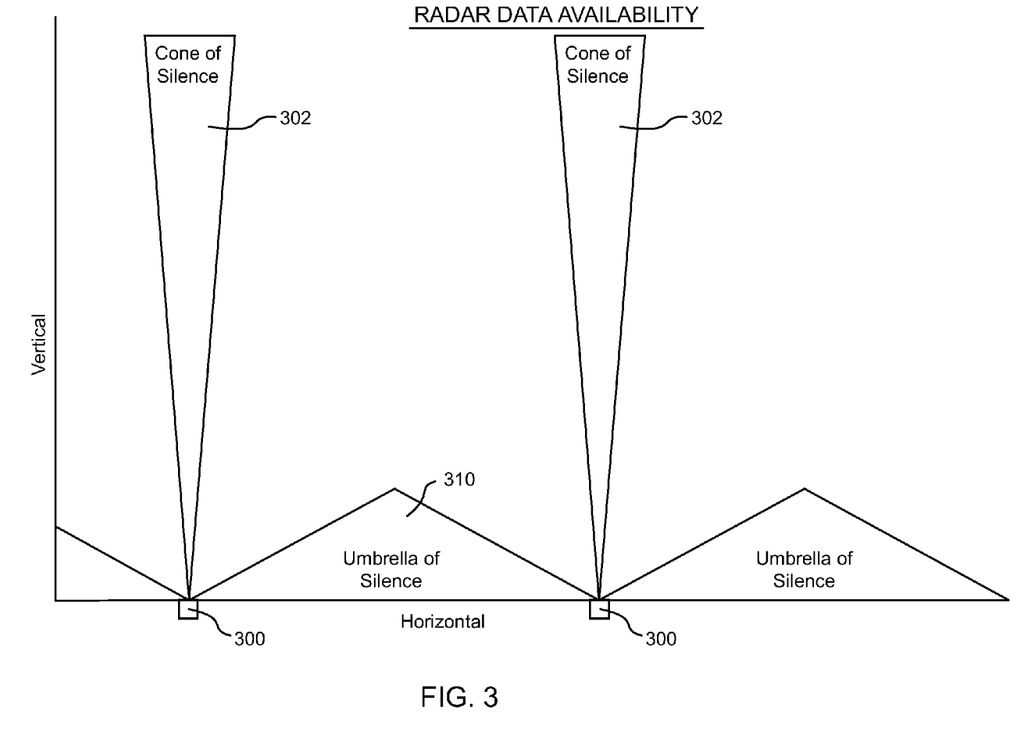
FIG. 3 is a schematic illustration of radar data availability and gaps, according to an exemplary embodiment.

Referring to FIG. 3, ground radar systems are configured to scan the atmosphere for weather data. These ground radar systems (e.g., ground radar system 300) are generally incapable of scanning directly overhead because of the maximum tilt elevation of the radar. This area includes a gap where no data is collected called a cone of silence 302. Multiple ground radar systems 300 spaced at various intervals may be used to increase coverage of the atmosphere. Radar scans of multiple systems generally intersect or overlap at some distance and elevation from radar station 300. Because the ground radar sweeps or scans have a minimum angle in which they can scan, a gap is generated beneath the lowest elevation of the ground radar scans and extending up to a point in which the scans intersect. This gap is called an umbrella of silence 304. Other gaps may exist in ground radar sweeps, for example gaps generated because of terrain obstruction such as from mountains. In addition to ground sensors, airborne weather radar sensors may be used to scan the gap areas and downlink the data to a weather system or weather data processing center.

Currently, approximately 3,000 aircraft are flying worldwide and are equipped with automatic airborne radars. Automated radars provide the pilot with a hands-free operating system that detects precipitation at a range of about 320 nautical miles ahead of the aircraft. Automatic radars have the capability to be programmed to scan specific areas of the atmosphere. They can be used to automatically scan areas where there are known gaps in the US and Global Radar detection network. In addition, they can be used in a net-centric manner to scan areas of the atmosphere that have the potential for severe weather. Scanning these areas may improve the radar scan updates for severe storms and potentially improve forecasting of the severe weather as well as shorten the forecast cycle. Improving forecasting of severe weather and shortening the forecast cycle may benefit aviation as well as ground based operations. Current and planned future aircraft densities may provide a dense network of airborne weather radar observation nodes to scan the NEXRAD ground radar coverage gaps in the continental US, other regions, or the world over.

Figure 4:
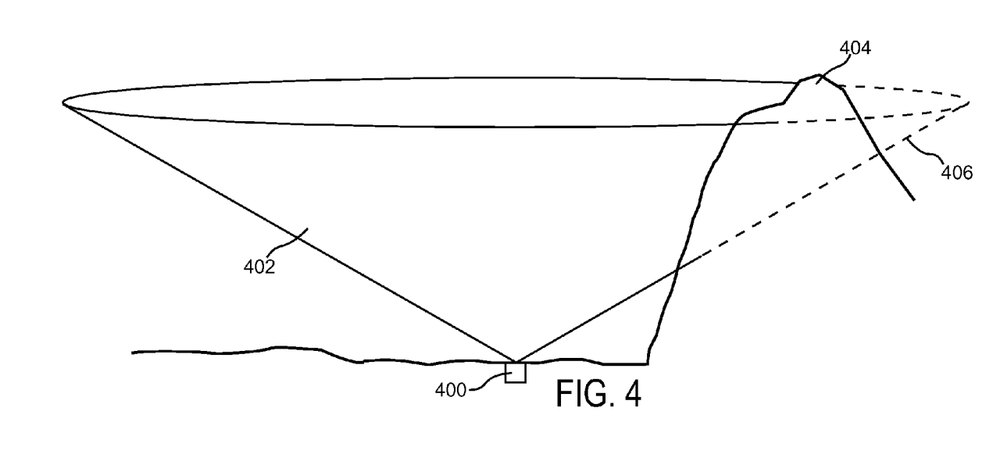
FIG. 4 is a schematic illustration of a ground radar sweep and radar gap due to terrain, according to an exemplary embodiment.
Figure 5:
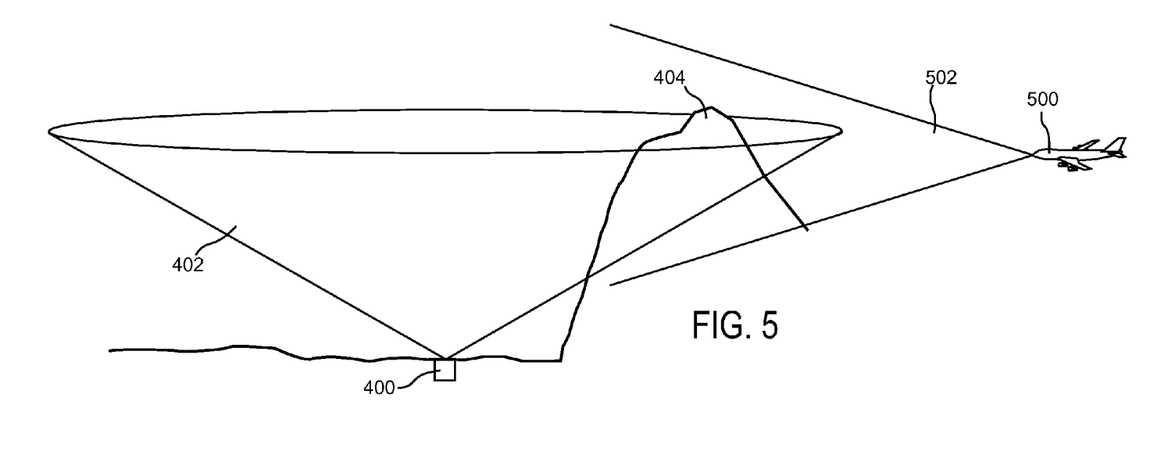
FIG. 5 is a schematic illustration of the radar sweep and gap of FIG. 4, where an aircraft is gathering data from the radar gap portion, according to an exemplary embodiment.

Referring to FIG. 4, a ground radar system 400 generates a radar sweep 402 that is obstructed by a terrain feature 404, e.g., a mountain. Radar sweep 402 is unable to penetrate terrain feature 404, causing a gap 406 in the coverage of radar sweep 402. Referring also to FIG. 5, an aircraft 500 may be directed to provide an airborne radar scan 502 of the gap area in order to provide more complete data in the area and eliminate or reduce the size of gap 406. According to various exemplary embodiments, the scan may be used to provide more complete weather data and/or terrain data. According to some exemplary embodiments, a weather system or data center may direct a nearby aircraft that has gap 406 within radar range of its flight plan to provide airborne scan 502 and provide radar data to the weather system or other aircraft. According to other exemplary embodiments, the aircraft may be directed to deviate from its flight plan to provide airborne scan 502 if the region is of particular interest (e.g., because of storm path, predicted aircraft density, potential convective cell, potential turbulence, potential high icing area, a flight corridor, an adjacent corridor, etc.).

Figure 6:
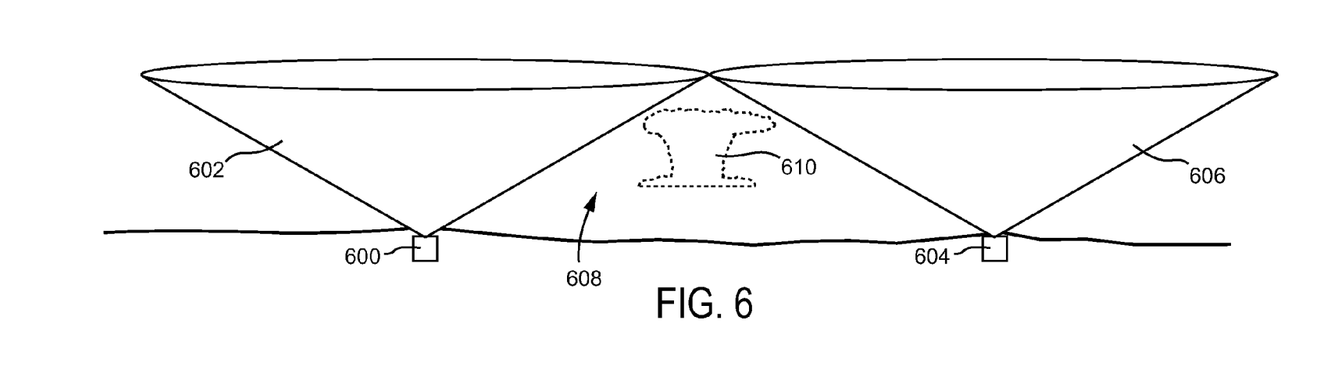
FIG. 6 is a schematic illustration of multiple ground radar sweeps and an umbrella of silence, according to an exemplary embodiment.
Figure 7:
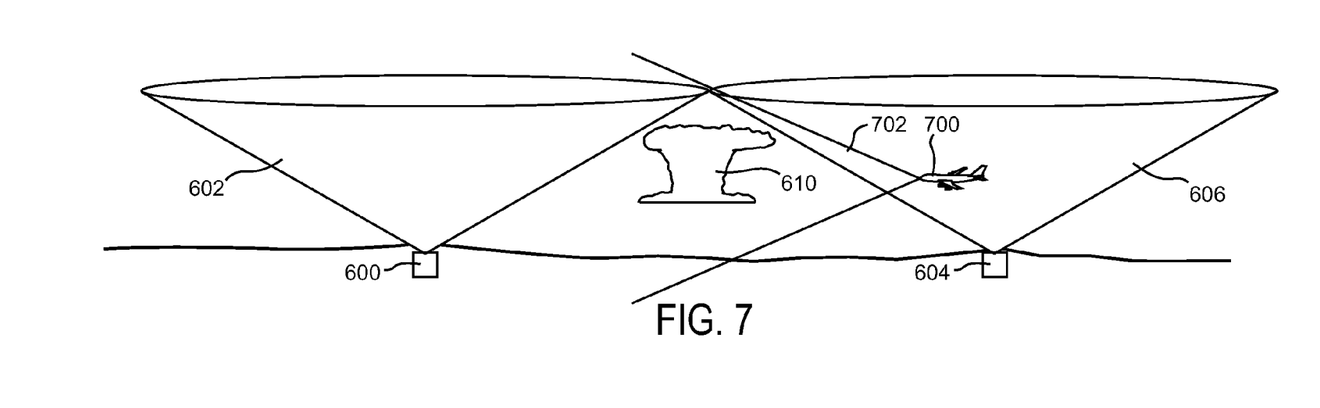
FIG. 7 is a schematic illustration of the radar sweeps and umbrella of silence of FIG. 6, where an aircraft is gathering data from the umbrella of silence portion, according to an exemplary embodiment.

Referring to FIG. 6, a ground radar system 600 generates a ground radar sweep 602 and a ground radar station 604 generates a radar sweep 606 to increase weather data coverage of the atmosphere. Radar sweeps 602 and 606 generate an umbrella of silence region 608. Such a region may conceal various weather information, for example a convective cell 610. Referring also to FIG. 7, an aircraft 700 may be directed to provide an airborne radar scan 702 of umbrella of silence region 608 in order to provide more complete data in the area and eliminate or reduce the size of region 608. Airborne radar scan 702 may reveal the presence of umbrella of convective cell 610. Alternatively, convective cell 610 may have been identified in radar sweep 602 or 606 and moved into region 608 where it could not be tracked. Aircraft 700 may be used to provide data regarding cell 610 to the weather system or other aircraft when it is in region 608. A weather system or data center may direct a nearby aircraft that has gap 608 within radar range of its flight plan to provide airborne scan 702. According to other exemplary embodiments, the aircraft may be directed to deviate from its flight plan to provide airborne scan 702 if the region is of particular interest (e.g., because of storm path, predicted aircraft density, potential convective cell, potential turbulence, potential high icing area, a flight corridor, an adjacent corridor, etc.).

Figure 8:
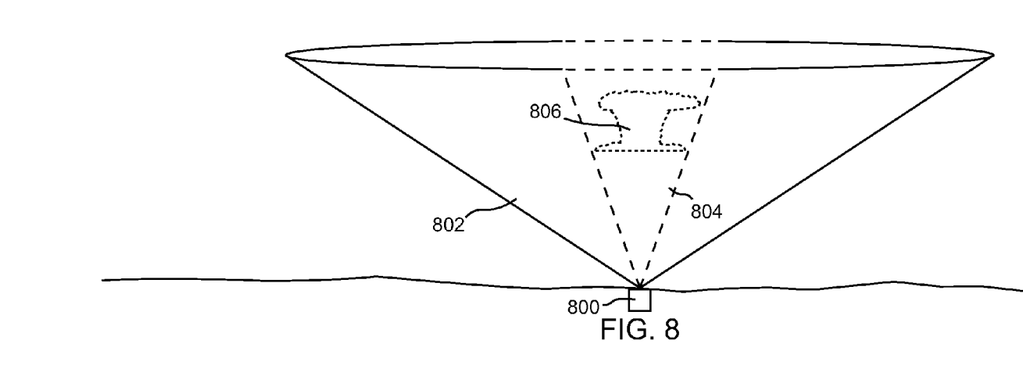
FIG. 8 is a schematic illustration of a ground radar sweep and a cone of silence, according to an exemplary embodiment.
Figure 9:
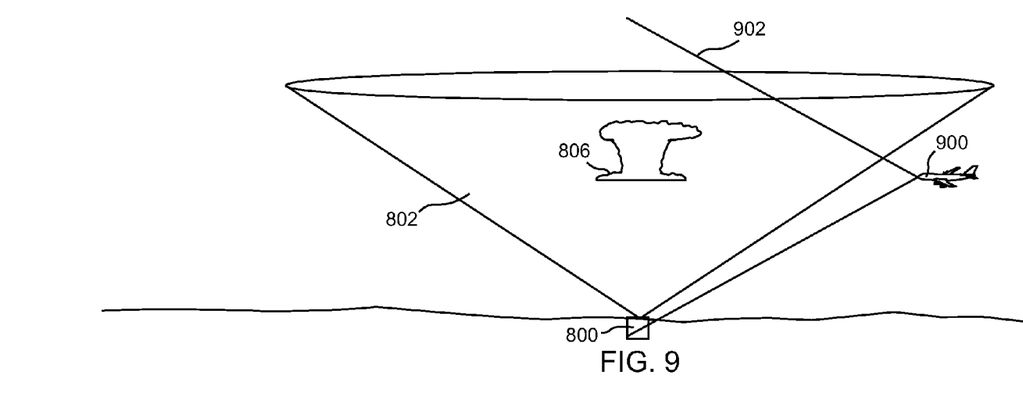
FIG. 9 is a schematic illustration of the radar sweep and cone of silence of FIG. 8, where an aircraft is gathering data from the cone of silence portion, according to an exemplary embodiment.

Referring to FIG. 8, a ground radar system 800 generates a radar sweep 802 that includes a cone of silence region 804 directly above ground radar station 800. Such a region may conceal various weather information, for example a convective cell 806. Referring also to FIG. 9, an aircraft 900 may be directed to provide an airborne radar scan 902 of umbrella of silence region 804 in order to provide more complete data in the area and eliminate or reduce the size of region 804. Airborne radar scan 902 may reveal the presence of umbrella of convective cell 806. Alternatively, convective cell 806 may have been identified in radar sweep 802 and moved into region 804 where it could not be tracked. Aircraft 900 may be used to provide data to the weather system or other aircraft regarding cell 806 when it is in region 804. A weather system or data center may direct a nearby aircraft that has gap 804 within radar range of its flight plan to provide airborne scan 902. According to other exemplary embodiments, the aircraft may be directed to deviate from its flight plan to provide airborne scan 902 if the region is of particular interest (e.g., because of storm path, predicted aircraft density, potential convective cell, potential turbulence, potential high icing area, a flight corridor, an adjacent corridor, etc.).

Figure 10:
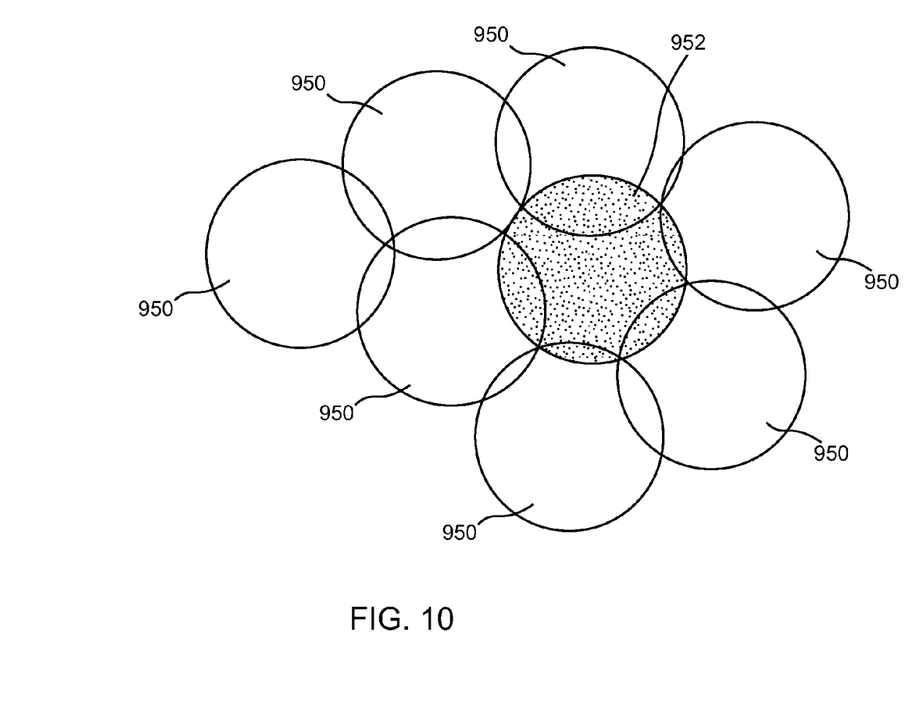
FIG. 10 is an overhead schematic illustration of multiple ground radar systems including an inoperative region, according to an exemplary embodiment.

Referring to FIG. 10, a schematic view of a ground radar coverage map indicates coverage regions 950 from multiple ground radar systems and an inoperative region 952, according to an exemplary embodiment. While portions of inoperative region 952 may overlap with coverage regions 950, other portions of inoperative region 952 do not overlap with any coverage regions and thus a gap in radar coverage is formed. Inoperative region 952 may be due to a lack of a ground radar (e.g., undeveloped area, body of water, etc.) or due to a ground radar that is malfunctioning, being repaired, or otherwise switched off or unavailable for use. In such scenarios, an aircraft may be directed to provide an airborne radar scan of inoperative region 952 or of a gap portion of inoperative region 952 in order to provide more complete data in the area and eliminate or reduce the size of the gap. A weather system or data center may direct a nearby aircraft that has the gap portion of region 952 within radar range of its flight plan to provide the airborne scan. According to other exemplary embodiments, the aircraft may be directed to deviate from its flight plan to provide the airborne scan if the region is of particular interest (e.g., because of a storm path, predicted aircraft density, potential convective cell, potential turbulence, potential high icing area, a flight corridor, an adjacent corridor, etc.).

While the illustrated ground radar sweeps and gaps have been shown to have specific relative dimensions, according to various exemplary embodiments, the dimensions of the radar sweep and gaps may be of any size depending on the ground radar in use and the terrain in which the radar system is installed. It is also noted that the illustrations of FIGS. 4-10 are not to scale and have been provided for exemplary and illustrative purposes. Further, while the gaps illustrated are gaps in ground radar coverage, in other exemplary embodiments, the gaps may be gaps in airborne radar coverage due to attenuation or limited visibility.

In the exemplary embodiments of FIGS. 4-10, it has generally been shown that a ground radar or ground station may direct an aircraft to scan a gap region. In such embodiments, the ground station may address a specific aircraft or may send a broadcast signal to all aircraft in an area requesting a scan of a region. If the signal is broadcast, one or more aircraft closest to the region or having the region in their radar range or flight plan may perform the scan. Alternatively or in addition, the aircraft may have a database of ground radar station locations. In such embodiments, the aircraft may interrogate the ground station for information on where scans are needed or where gaps in coverage may be. The database may also include information on effective ranges of the ground radar stations so the aircraft can automatically determine where gaps in coverage exist. Alternatively, the database may include information on where ground gaps in coverage are known to exist. If such information is available, the flight plan can be calculated before the aircraft takes off (or while in the air) to scan one or more gap regions.

Figure 11:
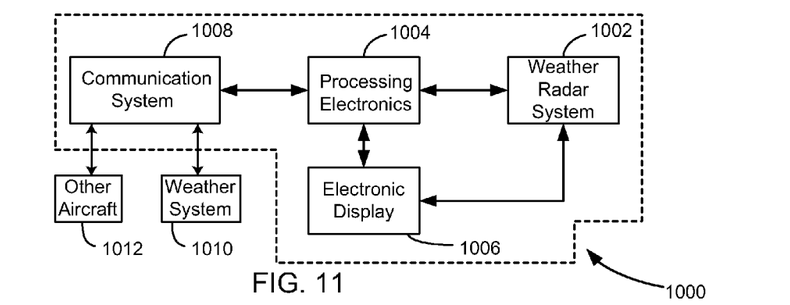
FIG. 11 is a block diagram of an aircraft radar system, according to an exemplary embodiment.

Referring to FIG. 11, an aircraft radar system 1000 is shown, according to an exemplary embodiment. System 1000 is shown to include a weather radar system 1002, processing electronics 1004, an electronic display system 1006, and a communication system 1008. Weather radar system 1002 is generally configured to cast one or more radar beams from an aircraft mounted antenna, to receive returns, and to interpret the returns (e.g. for display to a user, for transmission to an external weather system, etc.). Additionally, weather radar system 1002 can perform multiple radar sweeps. The radar sweeps can include horizontal sweeps, vertical sweeps, or a combination of horizontal and vertical sweeps. Furthermore, the radar sweeps can be performed such that they are substantially orthogonal to one another. According to other exemplary embodiments, weather radar system 1002 can be a monopulse or sequential lobing radar system or a radar system with an aperture capable of switching modes.

Weather radar system 1002 can be a system for detecting weather patterns. Detected weather patterns can be communicated to electronic display system 1006 for display to the flight crew. Detected weather patterns may instead or may also be provided to processing electronics 1004 for further analysis or transmission to an external weather system 1010 or another aircraft via communication system 1008. As described above, weather system 1010 may direct the aircraft via communication system 1008 to scan in specific areas in order to scan gaps in ground-based radar coverage. The scans performed by radar system 1002 may be transmitted to weather system 1010 or another aircraft 1012 via communication system 1008 to supplement the ground-based radar coverage.

Figure 12:
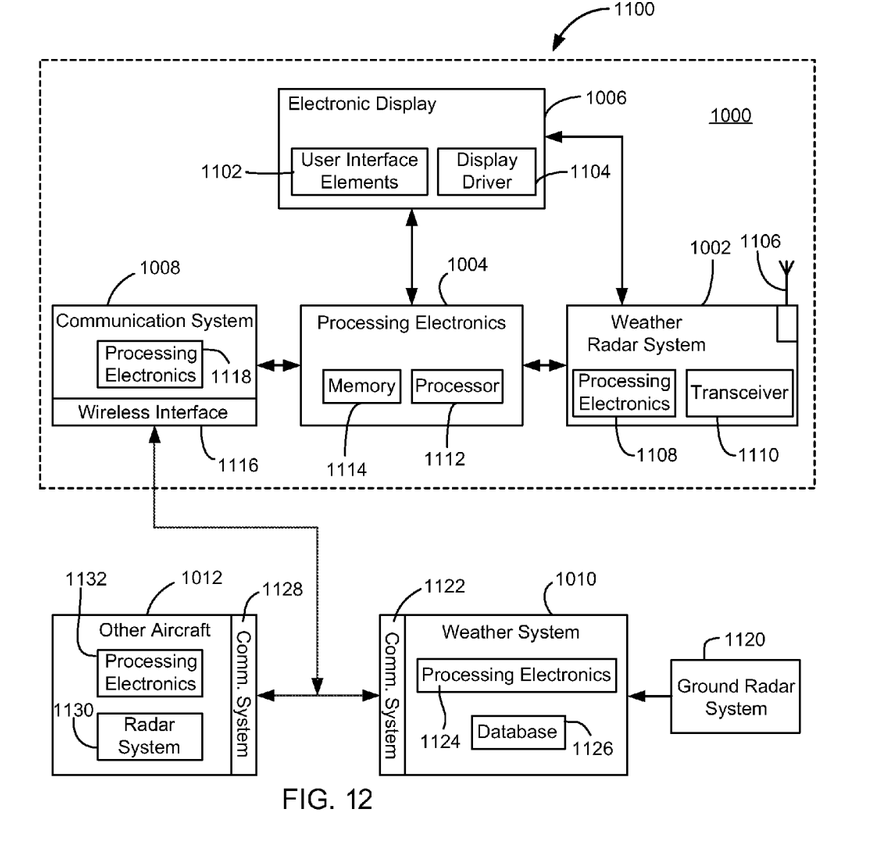
FIG. 12 is a block diagram of a radar system, according to a further exemplary embodiment.

Referring to FIG. 12, the aircraft radar system 1000 is shown in greater detail as a part of a radar system 1100, according to an exemplary embodiment. As described above, aircraft radar system 1000 can include weather radar system 1002, processing electronics 1004, an electronic display system 1006, and a communication system 1008.

Electronic display system 1006 can be used to display information from weather radar system 1002 or other electronic equipment. Electronic display system 1006 can include user interface (UI) elements 1102, display 20, and a display driver 1104. Display driver 1104 can be any computer hardware and/or software that enables electronic display system 1106 to communicate with and receive data from various other components. UI elements 1102 can be used for selection of data shown on display 20 or to apply corrections to data shown on display 20. For example, UI elements 1102 may be used to select specific or appropriate data corresponding to ground radar gaps for transmission to weather system 1010. Input received from UI elements 1102 is processed by display driver 1104. Display driver 1104 may then communicate the received input to processing electronics 1004 or various other components.

Weather radar system 1002 may be used to detect weather patterns in the vicinity of the aircraft, such as weather patterns corresponding to gaps in ground-based radar coverage. Weather radar system 1002 can provide weather related information to electronic display 1006 and/or processing electronics 1004. Weather radar system 1002 includes an antenna 1106, processing electronics 1108, and a transceiver 1110. Transceiver 1110 is configured to transmit radar signals via antenna 1106 and to receive radar returns via antenna 1106.

Antenna 1106 can be used to perform a radar sweep for detecting weather information. In addition to use for weather detection, antenna 1106 can also receive return signals from ground/terrain features. The tilt of antenna 1106 can be controlled thereby enabling multiple steered radar sweeps to be cast at multiple tilt angles. For example, antenna 1106 may be directed specifically towards a gap region of ground radar coverage between normal radar scans of the surrounding area. The airborne radar data collected from the radar can then be downlinked to the ground weather processing models of weather system 1010 to improve weather observations and forecasts.

Weather radar system 1002 may be any automatic radars, for example as commercially available from Rockwell Collins, Inc. of Cedar Rapids, Iowa. Such automatic radars may have several advantages as a source of data to fill in gap regions around ground radar sites. Automatic radars have standardized antenna patterns, standardized ground clutter rejection algorithms, and the ability to interrupt normal horizontal antenna sweeps with configurable auxiliary antenna sweeps in either elevation or in azimuth. These characteristics may be advantageously used to support the ground radar data gathering process.

Processing electronics 1108 may be any hardware and/or software processor or processing architecture capable of executing instructions and processing radar returns. Any of the radar returns available to processing electronics 1108 can be provided to processing electronics 1004 for further processing. For example, processing electronics 1108 may be configured to examine return data from antenna 1106, thereby determining regions of weather activity. Processing electronics 1108 may also be used to send electrical signals to antenna 1106 in order to tilt antenna 1106 and steer a radar sweep. Further, processing electronics 1108 may be configured to construct a weather radar map based upon radar returns. The constructed weather radar map may be output to processing electronics 1004 for further analysis or transmission to weather system 1010 or aircraft 1012. The constructed weather radar map may instead or may also be output to electronic display 1006.

Processing electronics 1004 may be configured to verify data received from radar system 1002 or to facilitate transmission of radar data to weather system 1010 or other aircraft 1012 via communication system 1008. Processing electronics 1004 includes a processor 1112 and a memory 1114. Processor 1112 may be any hardware and/or software processor or processing architecture capable of executing instructions (e.g., computer code stored in memory 1114) and operating on various data types. Memory 1114 may be any volatile or non volatile memory configured to store instructions or operations for execution by processor 1112. Alternatively, memory 1114 may be configured to store radar data received from communication system 1008 or from radar system 1002. Memory 1114 may also store data related to ground radar stations, such as location and effective radar range of the station.

Processing electronics 1004 may be able to determine weather or terrain types using radar range information, azimuth information, and elevation information provided by weather radar system 1002. For example, processing electronics 1004 may determine the presence of a convective cell due to radar data indicating high reflectivity or turbulence. If the radar scan region is a ground radar gap area, processing electronics 1004 may specifically identify the convective cell information in data transmission to weather system 1010 or aircraft 1012 via communication system 1008.

Communication system 1008 is configured to establish a datalink with weather system 1010 and/or aircraft 1012. Communication system 1008 is configured to transmit radar data from radar system 1002 to weather system 1010 or aircraft 1012 and to receiving radar data or a gap scan request from weather system 1010 or aircraft 1012. Communication system 1008 includes a wireless communication interface 1116 configured to facilitate communication between weather system 1010 or aircraft 1012 and aircraft radar system 1000. Wireless communication interface may be any interface capable of sending and receiving data using a radio frequency (RF) signal. Communication system 1008 may also include processing electronics 1118 configured to parse, encrypt, or prepare data into an appropriate format for transmission by interface 1116. For example, if processing electronics 1004 is providing radar data from a scan of a gap region by radar system 1002 for transmission to weather system 1010 or aircraft 1012, processing electronics 1118 may convert the data into a format suitable for transmission by interface 1116. Processing electronics 1118 may also be configured to assemble, decrypt, or otherwise analyze data received by interface 1116 for use by processing electronics 1004. For example, if interface 1116 receives a signal directing the aircraft to scan a ground radar gap region, processing electronics 1118 may provide the signal to processing electronics 1004 in a format that it can process. It is noted that while the Figures illustrate direct communication with weather system 1010 and aircraft 1012, according to other exemplary embodiments, communication may be routed via one or more satellites or other third party relays within the line of sight of the aircraft.

Weather system 1010 (e.g., a 4-D weather cube) may be any ground based or airborne electronic system configured to map weather using both ground radar and aircraft radar. Weather system 1010 receives radar data from one or more ground radar systems 1120 to generate an atmospheric coverage map. Data may be received from radar systems 1120 via satellite communication, a hardwired network connection, via the Internet, a wireless network, or any other suitable means. Weather system 1010 includes a wireless communication system 1122, processing electronics 1124, and a database or memory 1126.

Wireless communication system 1122 may be similar to communication system 1008 and is configured for transmitting radar data or weather alerts from ground radar systems 1120 and/or aircraft radar systems to aircraft radar system 1000 or aircraft 1012. Communication system 1122 is also configured to provide signals to aircraft radar system 1000 or aircraft 1012 to direct radar scans of gap regions in radar coverage from ground systems 1120. Communication system 1122 is further configured to receiving radar data aircraft radar system 1000 or aircraft 1012 for building a coverage map.

Processing electronics 1124 is configured to process radar data received from ground radar systems 1120, aircraft radar system 1000, and aircraft 1012. Processing electronics 1124 can generate radar coverage map base don the received radar data. If there is a gap in the generated coverage map, processing electronics 1124 may generate a command signal for transmission to aircraft radar system 1000 or aircraft 1012 via communication system 1122 to scan the gap region and provide radar data from the gap region. Processing electronics 1124 may be further configured to analyze weather data received from ground radar systems 1120, aircraft radar system 1000, and aircraft 1012. For example, processing electronics 1124 may detect convective cells, areas of turbulence, lightning, or other weather data based on the received radar data. Processing electronics 1124 may then track or forecast any of the identified weather data and provide alerts or threat assessments to aircraft radar system 1000 or aircraft 1012 if the aircraft is approaching the path, location, or region of the weather data. Processing electronics 1124 may also provide alerts to the general public regarding severe weather.

Database 1126 is configured to store the radar data received from ground radar systems 1120, aircraft radar system 1000, and aircraft 1012. Database 1126 may also store results related to the radar data, such as identification of gaps in the ground radar, identification of weather cells, weather threat assessments or alerts, a log of radar scan requests, additional information received from aircraft radar system 1000 or aircraft 1012, etc. According to various exemplary embodiments, database 1126 may be any software or hardware database capable of storing radar return data and data related to radar returns.

Aircraft 1012 may include a wireless communication system 1128, a radar system 1130, and processing electronics 1132. Communication system may be similar to communication system 1008 for transmitting radar data to weather system 1010 and receiving radar data or scan commands from weather system 1010. Radar system 1130 may be similar to weather radar system 1002 and can be configurable to direct radar scans to gaps in ground based radar mapping. Processing electronics 1132 may be similar to processing electronics 1004 and configured to analyze radar data from radar system 1130 for transmission to weather system 1010 and interpret commands from weather system 1010 for directing radar system 1130 to a gap region.

In addition to reducing gaps in radar coverage, when ground station 1010 or other aircraft 1012 receive weather information from another source, the information can be used to refine an existing weather assessment including deriving a weather forecast.

While there may be some disadvantages of using airborne radar assets, advantageously, use of airborne radar systems provides a large number of radar systems operating over very wide geographic/altitude regions at any one time. While some airborne radars operating in the region of a sited ground radar system may be operating at altitudes where neither the umbrella of silence or the cone of silence can be sampled, other aircraft may be operating at altitudes, standoff ranges, and aircraft headings where high quality information can be generated for combination of ground and airborne weather radar data. Such an opportunistic sampling strategy may be augmented by ground based commanding of the airborne radar sampling volume. A commanded sampling process may be similar to a process used by an aircraft radar system where weather features are assessed with auxiliary antenna scans. These scans may time-share the radar with the normal weather sampling/display process. With the normal aircrew displays driven from memory systems within the radar, the commanded auxiliary antenna sweeps may be produced without any interference in the normal weather display presented to aircrew members.

The use of airborne and ground based radar technology may be used to improve warn on forecast capabilities. Warn on forecast allows weather services to issue warnings to the general public on potential severe storms before they become severe weather hazards (e.g., a hail warning before hail reaches ground). With additional weather information, such as remotely observing airborne radar providing additional monitoring of the potential severe storm, the forecast may have a higher probability of being correct (a lower false alarm rate) and add significant safety improvements to severe storms prediction. Because aircraft with airborne radars have global reach and because geostationary satellite (GOES) information may have global coverage, combining airborne and ground radar has global applicability to aircrew operating in countries around the world.

It is noted that while FIGS. 11 and 12 are generally described as including a radar system 1002, in other exemplary embodiments, radar system 1002 may be replaced or supplemented by a LIDAR system, an infrared system, or other detection or ranging system. In such embodiments, radar beams may be replaced by light beams of other wavelengths, for example in the visible spectrum, in the infrared spectrum, etc.

Figures 13, 14, 15:
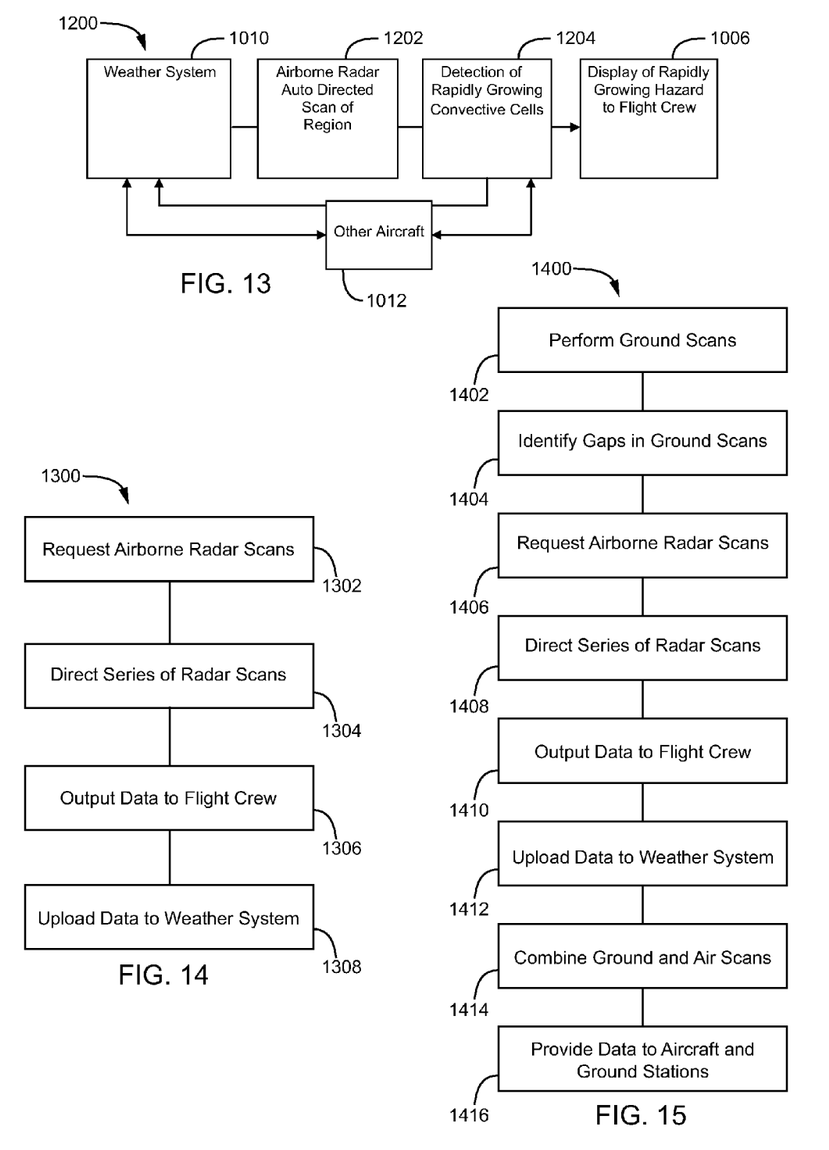
FIG. 13 is a block diagram of a radar mapping process, according to an exemplary embodiment.
FIG. 14 is a process flow diagram of a method for gathering data from radar gaps, according to an exemplary embodiment.
FIG. 15 is a process flow diagram of a method for gathering data from radar gaps, according to a further exemplary embodiment.

Referring to FIG. 13, a radar mapping process 1200 can be used to scan potential rapidly evolving severe storms or convective cells. Weather system 1010 (e.g., a 4-D weather cube) automatically generates and transmits commands 1202 to aircraft radar system 1000 via a datalink to direct an airborne radar scan or series of scans towards a storm (e.g., a severe storm) or convective cell. The airborne radar may be directed to perform scans 1204 of the potential rapidly evolving storm (e.g., as a local node of a shared 4-D weather cube) so that the storm can be scanned multiple times to provide the ground system with a rapid update of the development of potential severe cells. Alternatively, the scan may be directed to a cell traveling towards or growing into a gap in ground radar coverage to maintain tracking of the storm. Transmission of the command and execution of the scan may take between about 4 and 8 seconds depending on the location of the aircraft, the size of the area to be scanned, and the number of scans to be performed. The detected cells may be displayed to the flight crew on electronic display 1006 for immediate use. The detected cells and associated radar data may also be sent to other aircraft 1012 (e.g., nearby aircraft, other airborne nodes on a shared 4-D weather cube) for immediate use by the flight crew and to weather system 1010 for compilation with other ground and air based radar scans. Weather system 1010 may provide the compiled information or related treat assessments to various aircraft or organizations. To operate safely in proximity to airspace that has the potential for rapidly developing convection, airborne weather sensors may need to rapidly detect and monitor convective cells, apprise the aircrew to the existence of the hazard, and disseminate that information to other operators in the airspace (e.g., national airspace, global airspace, etc.). The weather system 1010 or 4-D weather cube may be used by weather service organizations and aviation authorities to provide weather observations and forecasts to aviation users or the general public.

Referring to FIG. 14, a method 1300 of radar mapping an airspace is illustrated according to an exemplary embodiment. Weather system 1010 provides a request for airborne radar scans to aircraft radar system 1000 to fill in gaps in ground radar coverage or provide more up to date information regarding a weather cell (step 1302). Weather radar system 1002 then directs one or more scans (e.g., a series of scans) towards the gap or region of interest (e.g., potential convective region, potential turbulence, potential high icing area, a flight corridor, an adjacent corridor, etc.) and receives radar data from the scans (step 1304). The radar data is output to the flight crew on electronic display 1006 for immediate use (step 1306). Processing electronics 1004 and communication system 1008 provide the radar data to weather system 1010 for further analysis or combination with other radar scans (step 1306).

Referring to FIG. 15, a method 1400 of radar mapping an airspace is illustrated according to an exemplary embodiment. Weather system 1010 receives radar data from ground radar systems 1120 (step 1402). Weather system 1010 then identifies gaps in the ground scans or identifies regions that may be of interest (e.g., potential convective cell, potential turbulence, potential high icing area, a flight corridor, an adjacent corridor, etc.) (step 1404). Based on these identifications, weather system 1010 provides a request for airborne radar scans to aircraft radar system 1000 to fill in gaps in ground radar coverage or provide more up to date information regarding a weather cell (step 1406). Weather radar system 1002 then directs one or more scans (e.g., a series of scans) towards the gap or weather cell of interest and receives radar data from the scans (step 1408). The radar data is output to the flight crew on electronic display 1006 for immediate use (step 1410). Processing electronics 1004 and communication system 1008 provide the radar data to weather system 1010 for further analysis or combination with other radar scans (step 1412). Weather system 1010 then combines and further analyzes the radar data received from aircraft radar system 1000 with radar data received from ground radar systems 1120 and other aircraft 1012 (step 1414). Weather system 1010 provides updated radar data, a weather threat assessment, or further commands to aircraft radar system 1000, other aircraft 1012, ground radar systems 1120, other organizations or authorities, or the general public (step 1416).

Exemplary embodiments may include program products comprising computer or machine-readable media for carrying or having machine-executable instructions or data structures stored thereon. For example, aircraft radar system 1000 and weather system 1010 may be computer driven. Exemplary embodiments illustrated in the methods of FIGS. 13 and 14 may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the components as shown in the various exemplary embodiments is illustrative only. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A system, comprising:
a weather system;
an aircraft radar system performing at least one first airborne radar scan of a specific region and receiving airborne radar return data from the at least one first airborne radar scan, the aircraft radar system transmitting the airborne radar return data to the weather system via a wireless communication link for supplementing ground based radar return data with the airborne radar return data, wherein the aircraft radar system includes a database of gaps of radar coverage associated with ground based radar systems, wherein the aircraft radar system automatically performs second airborne radar scans at locations associated with the gaps of radar coverage in the database along a flight path of aircraft and provides data from the second airborne radar scans; and wherein the weather system is configured to receive the ground based radar return data and to generate a first command for directing a second airborne radar scan, the second airborne radar scan being directed to at least one gap in radar coverage associated with ground based radar return data.

2. The system of claim 1, wherein the weather system generates a second command for directing a third airborne radar scan, the third airborne radar scan being directed to a region of interest.

3. The system of claim 2, wherein the region of interest comprises at least one of a potential convective region, a potential severe storm, a potential turbulence region, a potential high icing region, a flight corridor, and an adjacent flight corridor.

4. The radar system of claim 2, wherein the at least one gap in radar coverage associated with ground based radar return data comprises a gap in airborne radar coverage due to attenuation or limited visibility.

5. The system of claim 2, wherein the at least one gap and the region of interest are predetermined by the weather system prior to any aircraft taking off, and wherein any radar return data received by the weather system that is not in the gap or the region of interest is not used by the weather system.

6. The system of claim 2, wherein the weather system generates a plurality of commands for transmission to a plurality of aircraft, each of the plurality of commands directing the respective aircraft to perform the at least one first airborne radar scan of the specific region and provide respective airborne radar return data to the weather system.

7. The system of claim 2, wherein the weather system generates at least one of a radar map, a weather threat assessment, and a weather alert based on the ground based radar return data and airborne radar return data.

8. The system of claim 7, wherein the weather system provides the at least one of a radar map, a weather threat assessment, and a weather alert to one or more aircraft or ground stations.

9. The system of claim 2, wherein the weather system is located on the ground, is located on the same aircraft as the aircraft radar system, or is located on another aircraft.

10. The system of claim 2, wherein the airborne radar return data received by the weather system is used to refine a weather assessment or derive a forecast.

11. The system of claim 1, wherein the aircraft radar system provides the airborne radar return data to an electronic display for use by the flight crew.

12. The system of claim 1, wherein the aircraft radar system further provides the airborne radar return data to at least one other aircraft.

13. A method for supplementing ground based radar return data with airborne radar return data, comprising:
receiving the ground based radar return data at a weather system;
generating a first command using the weather system for directing at least one first airborne radar scan of a specific region;
generating a second command for directing a second airborne radar scan, the second airborne radar scan being directed to at least one gap in radar coverage associated with the ground based radar return data;
transmitting the first and the second command from the weather system to at least one aircraft via a wireless communication link;
automatically onboard the aircraft directing a third airborne radar scan of at least one gap stored in an aircraft database of gaps of ground based radar coverage;
receiving airborne radar return data at one or more aircraft radar systems from the at least one first airborne radar scan of the specific region, the second airborne radar scan, and the third airborne radar scan;
receiving the airborne radar return data from one or more aircraft radar systems at the weather system via the wireless communication link; and
supplementing the ground based radar return data with the airborne radar return data using the weather system.

14. The method of claim 13, wherein the weather system generates a third command for directing a fourth airborne radar scan, the fourth airborne radar scan being directed to a region of interest.

15. The method of claim 14, wherein the region of interest comprises at least one of a potential convective region, a potential severe storm, a potential turbulence region, a potential high icing region, a flight corridor, and an adjacent flight corridor.

16. The method of claim 13, further comprising:
generating a plurality of commands at the weather system;
transmitting the plurality of commands to a plurality of aircraft for performing at least one first airborne radar scan each of the plurality of aircraft of the specific region using each of the plurality of aircraft; and
receiving respective airborne radar return data to the weather system from each of the plurality of aircraft.

17. The method of claim 13, further comprising: generating at least one of a radar map, a weather threat assessment, and a weather alert using the weather system and based on the ground based radar return data and the airborne radar return data.

18. The method of claim 17, further comprising: providing the at least one of a radar map, a weather threat assessment, and a weather alert from the weather system to one or more aircraft or ground stations.

19. The method of claim 13, further comprising: refining a weather assessment or deriving a forecast using the weather system in response to the received airborne radar return data.

20. An aircraft radar system, comprising:
means for receiving ground based radar return data at a weather system;
means for generating a first command using the weather system for directing at least one first airborne radar scan of a specific region;
means for generating a second command to direct the aircraft radar system to perform a second airborne radar scan of a gap in radar coverage associated with the ground based radar return data and a third airborne radar scan of a region of interest;
means for transmitting the first and the second command from the weather system to an aircraft via a wireless communication link;
means for performing the at least one first airborne radar scan of the specific region and the second airborne radar scan of the gap in radar coverage, the third airborne radar scan of the region of interest using an aircraft radar system, and automatically performing a fourth airborne radar scan of a gap in radar coverage associated with the ground-based radar return data stored in a database on the aircraft when the aircraft radar system is near the gap stored in the database;

means for receiving airborne radar return data at the aircraft radar system from the at least one first airborne radar scan, the second airborne radar scan, the third airborne radar scan and the fourth airborne radar scan;

means for transmitting the airborne radar return data from the aircraft radar system to the weather system via the wireless communication link; and means for supplementing the ground based radar return data with the airborne radar return data using the weather system.

* * * * *